Inventor
D. J. Leech

Inventor
D. J. Leech

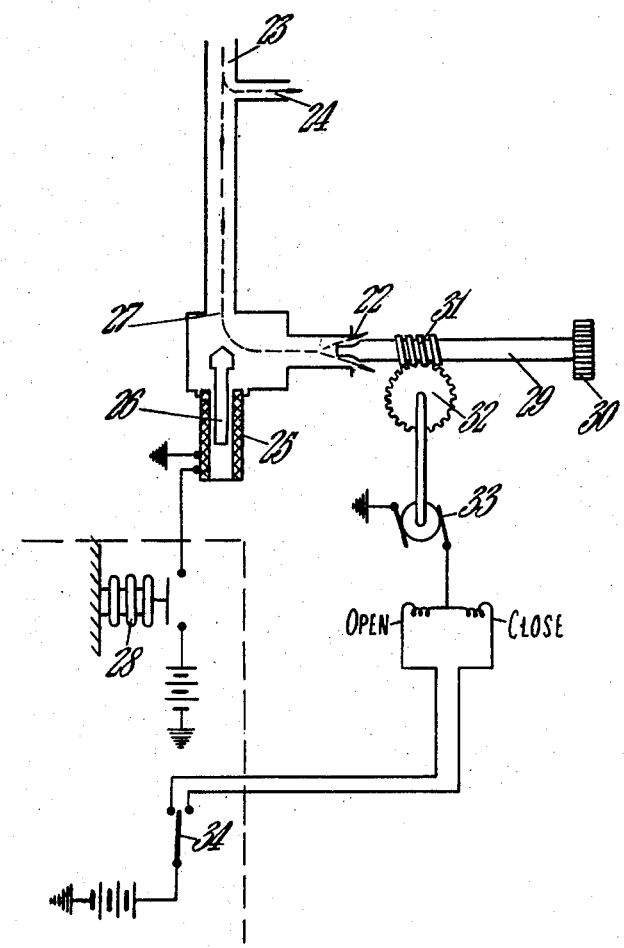
Fig. 3.a

United States Patent Office 2,902,915
Patented Sept. 8, 1959

2,902,915

AUTOMATIC AIR FLOW CONTROLLERS

Donald John Leech, Yeovil, England, assignor to Normalair Limited, Yeovil, England Application October 3, 1955, Serial No. 538,187

Claims priority, application Great Britain October 6, 1954

4 Claims. (Cl. 98—1.5)

In known types of flow control valves used in conjunction with aircraft cabin pressurising, the valves, in general, have normally made use of a flexible diaphragm which is subject to air pressure on both sides. The diaphragm has been used to trip a mechanism, either mechanically or electrically, to open or close and thereby admit more or less air to the system as required. The pressures acting on the diaphragm usually result from some form of flow measuring device.

Alternatively, mechanical arrangements have been proposed which rely solely on pressure differences between delivery to the valve and outlet from the valve, the pressure existing in any chamber or component exerting a back pressure and effecting the valve outlet pressure.

Both of these systems have the disadvantages that the flow characteristics of the valve may be adversely affected by variations in the downstream back pressure.

A further disadvantage is that it is not possible to vary the rate of flow through the valve so that any desired flow may be obtained.

A still further disadvantage is the number of independent units required for operation of the valve which in aircraft has attendant weight disadvantages; prior proposals of flow control valve have necessitated a flow measuring unit, a control unit operable by the measuring unit, and a valve unit operable by the control unit.

In some systems the valve may be required to be operated by a power actuator.

Yet a further disadvantage of systems now being employed is the use of small quantities of air under pressure to operate large diaphragms operating in turn very intricate mechanisms making accurate control difficult to achieve.

The object of the present invention is to overcome the above disadvantages.

The invention consists in an automatic air flow control device for aircraft cabin pressurising comprising a piston subject on one side to pressure from an air-pressure source and on the other to a reduced pressure normally intermediate between said pressure and some convenient low-pressure, e.g. the pressure prevailing within the cabin or atmospheric pressure, said piston being operatively associated with a movable sleeve or the like co-acting with a fixed port and being spring-urged in a direction towards the piston face subjected to the air pressure of said source.

The invention also consists in an automatic air flow control device as set forth in the preceding paragraph wherein said reduced pressure is obtained by providing a fixed bleed orifice (which may be downstream) in the piston and a variable bleed opening (which may be upstream) in or from the cylinder containing said piston.

The invention also consists in an automatic air flow control device as set forth in either of the two preceding paragraphs wherein two or more springs are employed acting in parallel for obtaining a modified force-displacement rate.

The invention also consists in an automatic air flow control device as set forth in any of the three preceding paragraphs including an electric actuator for over-riding normal manual control of the variable bleed opening in accordance with temperature control.

The invention also consists in an automatic air flow control device as set forth in any of the four preceding paragraphs including a device responsive to cabin pressure such that upon the latter falling below a predetermined minimum a solenoid or the like will operate to effect closure of the variable bleed opening to a greater extent than normally prevailing so as to ensure maximum air flow delivery to the cabin under flood flow conditions.

The invention also consists in an automatic air flow control device for aircraft cabin pressurising substantially as hereinafter described with reference to the accompanying drawings.

Referring to the accompanying diagrammatic drawings:

Figures 3 and 3a are diagrammatic sketches of a convenient bleed valve control therefor.

Figure 1:
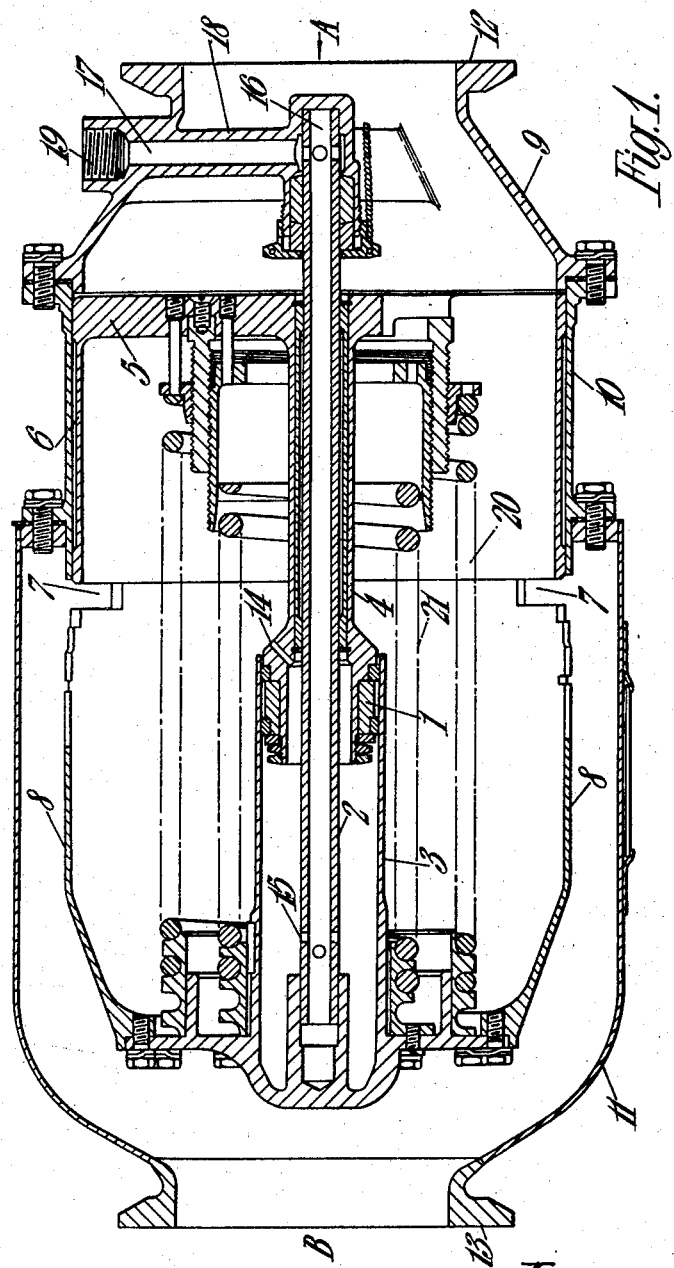
Figure 1 is a longitudinal section.
Figure 2:
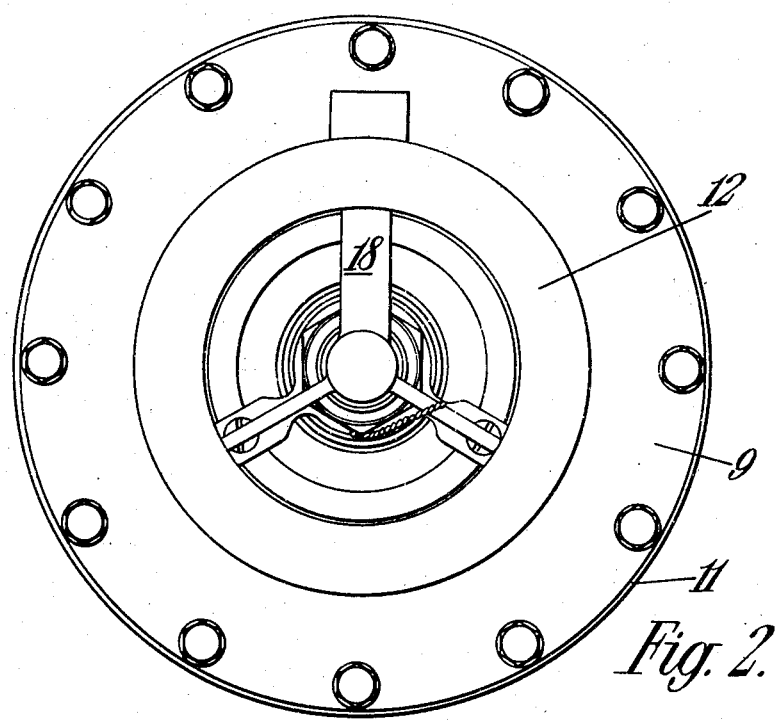
Figure 2 is an end view of one convenient form of controller embodying the present invention.

In carrying the invention into effect according to one form by way of example, a piston 1 slidably mounted on a longitudinal tubular member 2 and adapted to reciprocate within a cylinder 3, is furnished with a hollow connecting rod 4 attached to a web 5 integral with a sliding sleeve 6, the sleeve 6 being adapted to expose to varying extents ports 7 provided in a further cylinder 8 concentric with the first-mentioned cylinder 3. The latter cylinder 8 is rigidly associated with three parts 9, 10 and 11 bolted together to form a duct one end 9 of which by means of flange 12 is connected to a source of air pressure on the aircraft, e.g. a compressor, and the other end, by means of flange 13 is connected to a selector or mixing unit communicating either directly with the cabin or communicating therewith by way of an air cooling unit.

Figure 3:
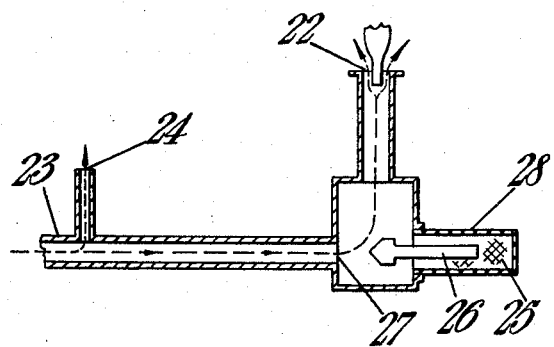

The piston 1 is furnished with a fixed bleed opening 14 and the cylinder 3 is connected, by way of ports 15 into the tubular member 2, by ports 16 out of the other end of the tubular member 2 and by way of a duct 17 drilled in one arm of a supporting web 18 in part 9, to the cabin space by way of a manually variable bleed opening 22, Figure 3, attached at 19 to pipe line 23 of the bleed valve, Figure 3.

Compression springs 20 and 21, in parallel in order to obtain a modified force/displacement rate, are provided to urge the piston 1 towards the end of the duct connected to the pressure source.

The air flow passes through the ports 7 under control of the sleeve 6 from the upstream face of the valve in the direction of arrow A to the downstream end B thereof, the piston 1 on one face being subjected to the pressure upstream of the ports and being subjected on its other face to a pressure dependent upon the relative areas of the two bleed orifices 14 and 22.

The pressure across the piston 1 drives it and the connecting sleeve 6 against the spring force so that the ports 7 are partially uncovered.

Should the cabin altitude rise to an unacceptable value, the evacuated bellows of a pressure switch 28 expand sufficiently to close the electrical circuit to energize a solenoid 25 so that the tapered end of the core 26 closes the end of pipe 23 on seating 27 so that the cylinder 3 is vented to static through the small fixed bleed 24 only. The pressure in the cylinder 3 will rise allowing the ports 7 to open and control the air flow to a very high value. If desired, the manual flow selection valve 29 normally operated by wheel 30, may be over-ridden by worm and wheel 31 and 32 respectively, driven by reversible electrical motor 33 in response to movement and a bimetallic thermostatic switch blade 34 disposed within the cabin.

For a fixed low value of the ratio of the two bleed orifice areas the pressure difference across the piston may be calculated for any upstream pressure, for example, in a particular aircraft as the upstream pressure increases from 15 p.s.i.a. (pounds per square inch absolute) to 200 p.s.i.a., the pressure across the piston increases from about 2½ p.s.i.a. to about 35 p.s.i.a. and hence the position of the sleeve for any upstream pressure is known. For this range of movement a curve of port area/travel may be determined in order that the flow area be reduced with increasing upstream pressure in such a way that the flow remains constant at, say 20 lbs. per minute. By selection of a larger value of the ratio between the bleed opening areas and the corresponding flow, an area/travel curve can be obtained to give a minimum constant flow, say 5 lbs./min. and such that the curve so obtained is continuous with the curve corresponding to the higher flow obtained with the lower value of the ratio.

By selecting values between the two above, flows are obtained which lie between the two above flows and for a given area ratio each flow is approximately constant regardless of the upstream pressure.

To a large extent values of the area ratio outside the extremes fixed above may be selected to obtain approximately constant airflows above the higher and below the lower values mentioned above and over a wide range of upstream pressures, although not over the whole range.

The area-deflection curves are calculated on the assumption that the flow through the ports is sonic, or near sonic, or that the downstream pressures can be predicted with sufficient accuracy.

If desired the manual flow selection may be overridden by a device, e.g. an electrical actuator so that temperature control may be used to over-ride the normal manual control of the variable bleed opening.

Again, when it is desired to provide a flood air-flow, e.g. in the case of a damaged cabin casing, the port may be suitably shaped whereby upon the cabin pressure dropping below a predetermined magnitude, a solenoid or the like will function in the same manner previously described in connection with Figure 3 to effect closure of the variable bleed opening to a greater extent than that normally prevailing; by this means a maximum air flow delivery to the cabin may be obtained.

Alternatively, a separate flood flow valve may be provided in a duct disposed in parallel with the duct dealing with the normal mass flow.

Air flow control devices embodying the present invention may be simple, compact and robust and yet light in weight, being operated simply by air under pressure flowing through a valve; elastic diaphragms may be entirely eliminated.

Instead of employing a port or ports controlled by a sleeve, a series of holes may be formed and arrangements made for the piston to obscure or open variable numbers of such holes.

I claim:
1. An automatic air flow control device for aircraft cabin pressurising having inlet and outlet connections including a cylinder having a closed end, a piston slidable in said cylinder adjacent the other end of the cylinder, a fixed bleed orifice in the piston, duct means having a restricted inlet communicating with the cylinder at one end thereof and with the cabin at the other end thereof, valve means controlling said restricted inlet, a source of inlet pressure in excess of cabin pressure, the piston being subject on one side to the inlet pressure and on the other side to cabin pressure, means for urging the piston in a direction toward the source of inlet pressure, a fixed member having outlet ports therein and inlet means in communication with the source of inlet pressure, a sleeve-like member of substantially greater diameter than that of said piston axially movable within the fixed member to control the outlet ports, and means operatively associating the piston with the sleeve-like member.

2. An automatic air flow control device as claimed in claim 1 wherein the means urging the piston in a direction toward the source of inlet pressure includes at least two springs acting in parallel serving to obtain a modified force-displacement rate.

3. An automatic air flow control device as claimed in claim 1 including manual control means for operating the valve, an electric actuator for overriding the manual control means and a thermostatic device disposed in said cabin and in controlling association with said actuator.

4. An automatic air flow control device as claimed in claim 1 including a device responsive to cabin pressure so that upon the cabin pressure falling below a predetermined minimum, a solenoid functions to effect closure of the restricted inlet to a greater extent than normally prevailing to ensure maximum air flow delivery to the cabin under flood flow conditions.

References Cited in the file of this patent
UNITED STATES PATENTS

| | | |
|---|---|---|
| 2,265,461 | Wagner | Dec. 9, 1941 |
| 2,316,237 | Grunert et al. | Apr. 13, 1943 |
| 2,456,215 | Price | Dec. 14, 1948 |
| 2,698,568 | Jensen | Jan. 4, 1955 |
| 2,731,974 | Krueger | Jan. 24, 1956 |